United States Patent Office 3,112,277
Patented Nov. 26, 1963

3,112,277
REGENERATING CATALYSTS EXPOSED TO CONTACT WITH PLUMBIFEROUS WASTE PRODUCTS
Edward Michalko, Chicago, Ill., assignor to Universal Oil Products Company, Des Plaines, Ill., a corporation of Delaware
No Drawing. Filed Sept. 19, 1960, Ser. No. 56,674
17 Claims. (Cl. 252—413)

The present invention relates to the regeneration or reactivation of catalytic contact masses which have become contaminated with lead as a consequence of exposure to contact with lead-containing waste products incident to the catalytic conversion of such waste products; and, in particular, the present invention concerns the regeneration of catalysts employed in the conversion of the exhaust gases emanating from an internal combustion engine using leaded fuel.

It is now recognized that the elimination of certain components present in automotive exhaust gases is highly desirable and of prime importance in protecting the public health and welfare. The unavoidably incomplete combustion of hydrocarbon fuels by the gasoline or diesel engine results in the generation of substantial quantities of unburned hydrocarbons and other undesirable materials which, as waste products, are released to the atmosphere through the exhaust line. With the ever-increasing concentration of automobiles, particularly in urban areas, the discharge of such waste products into the atmosphere may reach significantly deleterious proportions. These combustion products are believed to react with atmospheric oxygen, under the influence of sunlight, to produce what is now commonly referred to as smog. Such combustion products include, by way of example, unsaturated hydrocarbons, partially oxidized hydrocarbons such as alcohols, ketones, aldehydes and acids, etc., carbon monoxide, and various oxides of nitrogen and sulfur. Although at least a portion of these compounds may be partially removed by chemical sorption media, the conversion of exhaust gas constituents by catalytic means is by far the preferred technique. The desired objective is to achieve substantially complete conversion of all of the unburned hydrocarbons, particularly the high molecular weight unsaturated hydrocarbons, and carbon monoxide, as well as the partially-oxidized hydrocarbons hereinabove set forth, into carbon dioxide and water prior to discharging the exhaust gases into the atmosphere. Gasoline powered internal combustion engines are a major but not the only source of atmospheric pollution; others include diesel engines, propane or butane engines, natural gas engines, fired heaters, flare stacks, and the like.

Catalytic means for improving waste products for discharge into the atmosphere, and particularly for the conversion of the hydrocarbonaceous combustion products contained within the exhaust gases emanating from an internal combustion engine, necessitate the use of a catalyst possessing an exceptionally high degree of activity, and particularly stability or capability of performing its intended function for an extended period of time. A wide variety of factors affect the stability of active catalytic composites, which factors are generally peculiar to the environment in which the catalyst is employed. In regard to catalysts for the conversion of hydrocarbonaceous combustion products emanating from an internal combustion engine, the actual operation of the engine must be considered. For example, such engine is commonly operated over a wide range of speed and load conditions and, therefore, the combustion efficiency thereof correspondingly varies; the space velocity and temperature of the exhaust gases, as well as the concentration of combustible material therein, likewise vary over wide limits. The catalyst should be capable of withstanding high temperatures of the order of 1600° F. to as high as 2000° F. without rapid thermal deactivation, and preferably should possess maximum activity at substantially lower temperatures. The catalyst should have a relatively low threshold-activation temperature in order that the conversion reactions be self-initiating within a minimum time following startup from relatively cold conditions. In general, it is desirable that the catalyst be satisfactorily active at temperatures within the range of about 200° F. to about 2000° F.

The catalyst is usually disposed as a confined particle-form bed disposed in a suitable container or catalytic convertor which is installed in the engine exhaust line. The catalytic convertor may be of the through-flow, cross-flow, or radial-flow design and, in the case of vehicular applications, may supplant or be combined with the usual acoustic muffler. In the majority of systems, secondary or combustion air is injected upstream of the catalytic conversion zone, usually by means of an aspirator or by external compressor means.

Although a great many potentially good, high activity catalysts have been developed which perform well even under the aforesaid adverse conditions, such catalysts are nevertheless deleteriously affected by lead and lead compounds which are present as vapors or as entrained solids in the exhaust gases resulting from the combustion of a leaded fuel. The majority of motor fuels, including some fuels for marine engines, contain tetraethyl lead or equivalent lead compounds as an additive for increasing the antiknock efficiency of the engine in which the fuel is consumed. A typical commercial tetraethyl lead additive contains, in addition, approximately 2 gram-atoms of chlorine and 1 gram-atom of bromine, usually as ethylene dihalide, per gram-atom of lead, which is thus 1.5 times the stoichiometric quantity of halogen required to form the lead dihalide; in conventional terminology, the tetraethyl lead additive is said to contain 1.5 "theories" of halogen. The halogen serves as a scavenging agent to prevent buildup of lead deposits on spark plugs and engine cylinder walls by preferentially converting the lead tetraethyl, under the elevated cylinder temperatures prevailing during combustion, to highly volatile lead halides, for example, to lead chloride and lead bromide or to the oxyhalides of lead; minor quantities of lead do not react with halogen and are converted instead to less volatile lead oxides. The major proportion of these lead compounds are discharged, as vapors or fines, into the exhaust line along with the exhaust gases. When the resulting lead-contaminated exhaust gases pass into contact with the exhaust gas conversion catalyst, the stability of the catalyst is substantially impaired, which phenomenon is demonstrated by the fact that the catalyst deactivation rate is very much greater than when unleaded fuel is employed.

On its face, this result would appear quite anomalous since most of the lead enters the conversion zone as a halide, and the normal catalyst bed temperature is in the range of 500° F. to 1600° F. whereby such halide is readily volatilized, whence one would expect the lead halide to pass completely through the bed with as much facility as it escaped deposition upon the engine cylinder walls and exhaust manifold structure. Such, however, is not the case. Although various theories have been proposed to explain the deactivation of catalysts by lead, it appears that the principal mechanism by which catalyst poisoning or deactivation occurs is one of chemical reaction between the volatile lead compounds and the catalyst base whereby to yield a stable, relatively non-volatile lead compound-catalyst base complex which plugs the pores of the catalyst and/or forms a monomolecular film of complex over the entire micro-structure of the catalyst; evidence favors the latter theory because, in most instances, physical measurements of spent lead-contaminated catalyst reveal no appreciable reduction in surface area or pore volume as against those of the fresh catalyst. By catalyst base is meant a refractory inorganic oxide carrier or support, preferably of medium to high surface area, with which one or more catalytically active metals are composited. Typical bases include, for example, alumina, titania, silica, alumina-silica, alumina-zirconia, alumina-silica-zirconia, and the like. The deactivation of the catalyst is believed to proceed via the following reactions which are exemplary but not exhaustive of the several interactions of lead compounds with catalyst bases:

(1) $MeOH + PbX_2 \rightleftharpoons MeOPbX + HX$
(2) $MeOH + MeOPbX \rightleftharpoons MeOPbOMe + HX$
(3) $MeOPbX + H_2O \rightleftharpoons MeOPbOH + HX$
(4) $Me_2O + PbX_2 + H_2O \rightleftharpoons (MeO)_2Pb + 2HX$ where Me represents an equivalent of a metallic component of the catalyst base, e.g. Al, Zr, Ti, etc. and X is a halogen, for example, chlorine, bromine or iodine. Water, in the vapor or superheated vapor state, enters into Reactions 3 and 4, supra, which water is inevitably present in hydrocarbon combustion products. When the catalyst accumulates an average lead content within the range of 5% to 30% by weight, and, more commonly, 10% to 25% by weight, which may occur after anywhere from 1000 to 20,000 road miles of operation, depending upon the presence or absence of catalyst guard media, average space velocity, concentration of lead in the fuel, physical and/or chemical properties of the catalyst, and various other factors, the hydrocarbon and carbon monoxide conversion activities of the catalyst have usually fallen to such a low value as to preclude continued use, and such lead-contaminated catalyst must therefore be replaced with fresh catalyst or regenerated.

Experimental data have shown that when a catalyst is exposed to contact with a preponderance of plumbiferous gases, the lead content of the catalyst eventually stabilizes at an equilibrium level, usually in the range of from about 10% to about 25% by weight of lead, in a manner somewhat analogous to the deposition of coke upon cracking catalyst in a fluid catalytic cracking unit with resultant attainment of "equilibrium" catalyst.

The instant invention has for its principal objective a method of regenerating a lead-contaminated catalyst, and is founded upon the discovery that the conversion activity of such spent catalyst may be substantially restored by contacting the catalyst with an aqueous medium containing anions of a phosphorus acid. The term "phosphorus acid" as employed in the specification and appended claims is intended to denote one of the following acids; hypophosphorous acid, the phosphorous acids, hypophosphoric acid, and the several phosphoric acids.

Prior art methods of regenerating a lead-contaminated catalyst have been concerned with more or less complete removal of the lead by treating the catalyst with medium to strong acids such as nitric acid, hydrochloric acid, aqua regia, acetic acid, and the like. However, these reagents will also attack, by way of dissolution or oxidation or both, many of the components most beneficially employed in oxidation catalyst such as alumina, magnesia, titania, zirconia, copper, silver, gold, the iron group metals and oxides thereof, and to a lesser extent the platinum group metals; while the removal of lead may be substantially complete, there often results the concurrent loss of valuable catalytic constituents and/or an adverse chemical or physical change in the treated catalyst.

The phosphorus-compound solution of the instant invention, on the other hand, is extremely advantageous in that it causes no appreciable loss of catalytic constituents; further, while the phosphorus-compound solution generally effects the removal of only a minor portion of the lead, surprisingly the oxidation activity of the regenerated catalyst is nevertheless virtually completely restored.

The precise effect of the phosphorus-compound solution upon a lead compound-catalyst base complex is not known; it is established, however, that improved catalytic activity and any substantial degree of lead removal are not necessarily concomitant. For this reason it is believed that the phosphorus-compound solution converts the several lead compound-catalyst base complexes to a form or forms of lead which exert a substantially lessened deactivating effect upon the catalyst. While in some instances it is possible to accomplish more or less complete removal of lead from the catalyst by practice of this invention, it should be emphasized that such lead removal is not necessary to the successful utilization thereof. The instant method is, of course, applicable to regeneration in situ and to external regeneration.

In one embodiment, the present invention is directed to a method of regenerating a lead-contaminated catalyst which comprises subjecting said catalyst to contact with an aqueous medium containing anions of a phosphorus acid, as may be obtained by dissolving the free acid in water or by commingling a salt of a phosphorus acid with water, separating said catalyst from the aqueous medium and drying the catalyst.

A more specific embodiment of the instant invention provides a method of at least partially restoring the oxidation activity of an oxidation catalyst comprising from about 0.01% to about 10% by weight of a noble metal and in major proportion an inorganic refractory oxide base, said catalyst having become substantially deactivated by exposure to plumiferous exhaust gases under oxidation conditions, which method comprises subjecting said catalyst to contact with an aqueous medium containing anions of a phosphorus acid, separating said catalyst from the aqueous medium, water-washing the catalyst, and calcining the catalyst at a temperature above about 800° F.

The method of the present invention and the benefits afforded through the utilization thereof will be more clearly understood by defining several of the terms employed within the specification and the appended claims. The term "catalyst" or "oxidation catalyst" is intended to connote an element, compound, composite of two or more elements or compounds, or mechanical mixture of elements, compounds or composites which are employed for their catalytic activity in regard to the oxidative conversion of various waste products, particularly hydrocarbons and/or carbon monoxide. The terms "lead," "lead-containing" and "lead-contaminated" refer to metallic lead, lead compounds, particularly lead salts such as the sulfates and halides thereof, lead oxides, lead oxyhalides, mixtures of two or more such lead compounds, lead- or lead salt-catalyst complexes, etc., since the actual form or forms in which the lead may exist in the exhaust gases or in combination with the catalyst are not definitely known and, in any event, are of no consequence to the operability of the present method.

It is understood that the instant method of catalyst regeneration is applicable to a great many catalysts, and the invention is not therefore to be limited to regeneration of any one catalyst or class of catalysts.

Typical conversion catalysts to which the present invention may be applied comprise one or more catalytically active metallic components which are preferably composited with a refractory inorganic oxide carrier material. Suitable catalytically active metallic components include, but are not limited to, vanadium, chromium, molybdenum, tungsten, members of the iron group and platinum group of the periodic table, copper, silver and gold. A particular metal may be used singly or in combination with any of the foregoing metals. Thus, the catalyst may comprise metals selected from groups IB, VA, VIA and VIII of the periodic table. Especially desirable catalytically active metals or combinations thereof comprise the following: platinum, palladium, other noble metals such as iridium and rhodium, iron, cobalt, nickel, chromium, copper, vanadium, tungsten, molybdenum, manganese, silver, gold, and various mixtures including copper-cobalt, copper-iron, copper-chromium, nickel-chromium, cobalt-chromium, manganese-chromium, manganese-iron, platinum-iron, platinum-cobalt, platinum-nickel, palladium-iron, palladium-cobalt, palladium-nickel, palladium-copper, palladium-platinum, palladium-copper-cobalt, platinum-copper-cobalt, copper-cobalt-nickel-palladium, platinum-palladium-cobalt, etc.

As hereinabove set forth, the catalytically active metallic component or components are desirably composited with a refractory inorganic oxide, the latter serving as a carrier material therefor. Although greater stability and activity are usually obtained when the refractory inorganic oxide contains at least a portion of alumina, other suitable refractory inorganic oxides may be employed including silica, boria, titania, zirconia, hafnia, and mixtures of two or more. The carrier material may be manufactured by any suitable method including separate, successive, or co-precipitation methods of manufacture. The carrier material may comprise naturally occurring substances such as clays or earths, and may or may not be activated prior to use by one or more treatments including drying, calcining, steaming, or particular treatments with inorganic and organic reagents.

The catalytically active metallic components, hereinabove set forth, may be added to the carrier material in any suitable, convenient manner. The catalytically active metallic components may be combined with the carrier material by separate, simultaneous, or successive precipitation methods, or by impregnating the carrier material with a soluble salt of the catalytically active metal. For example, when platinum is employed, it may be added to the carrier material by commingling the latter with an aqueous solution of chloroplatinic acid. Other water-soluble compounds of platinum, or of other noble metal components, may be utilized within the impregnating solution. When the catalyst is to contain other metallic components, the catalyst may be prepared by commingling the soluble compounds of these components, particularly the nitrates, chlorides or carbonates, and soaking the particles of the inorganic refractory oxide therein, followed by heating to form the corresponding oxides of the metallic components. When impregnating techniques are employed, there may be one or more impregnating solutions containing one or more of the catalytically active metallic components. For example, when the catalyst is to contain both platinum and cobalt, the platinum may be impregnated within the carrier material, subsequently calcined, followed by a second impregnating technique incorporating the cobalt component. Although the precise means by which a metallic component is combined with a refractory carrier material is not known, it is believed that it exists in some physical association or chemical complex therewith. Thus, platinum may be present as a free metal, or as a chemical compound or in physical association with the carrier material, or with the other catalytically active metallic components, or in some combination with both. Many methods of preparing such catalytic composites exist and are well known in prior art; these need not be described in detail herein since no claim is being made for any particular method of manufacturing the conversion catalyst.

The sphere of application of the present invention having been set forth, the instant regeneration technique will now be described more explicitly. After the spent catalyst has been exposed to contact with lead-containing exhaust gases under conversion conditions for sufficient time as to become substantially deactivated, which may occur after anywhere from 1000 to 20,000 equivalent road miles of use, it becomes necessary to regenerate or reactivate it.

As hereinabove set forth, the regeneration is effected by contacting the catalyst with an aqueous medium containing anions of a phosphorus acid, the source of which may be the free acid or a water-soluble salt thereof; any water-soluble salt which is soluble in an amount of about 0.5% by weight or more, at the desired solution temperature, is satisfactory; the preferred salts are the sodium, potassium, and ammonium salts, including the monohydrogen and dihydrogen salts where these exist. The phosphorus of the anion may have an oxidation state of +1, +3, +4, +5, +6, or +7, which gives rise to a considerable number of compounds useful in the instant invention, as set forth in part hereinbelow.

Exemplary compounds of the +1 oxidation state are hypophosphorous acid, $H(H_2PO_2)$; potassium hypophosphite, sodium hypophosphite, and ammonium hypophosphite.

Representative compounds wherein phosphorus exists in the +3 oxidation state include pyrophosphorous acid, $H_4P_2O_5$; orthophosphorous acid, $H_2(HPO_3)$; potassium dihydrogen-orthophosphite, $KH_2PO_3$; potassium monohydrogen-orthophosphite, $K_2HPO_3$; sodium dihydrogen-orthophosphite, $NaH_2PO_3$; sodium monohydrogen-orthophosphite, $Na_2HPO_3$; ammonium dihydrogen-orthophosphite, $(NH_4)H_2PO_3$.

Typical compounds in which phosphorus exists in the +4 oxidation state include hypophosphoric acid, $H_4P_2O_6$; sodium hypophosphate, $Na_4P_2O_6$; sodium dihydrogen-hypophosphate, $Na_2H_2P_2O_6$; ammonium dihydrogen-hypophosphate, $(NH_4)_2H_2P_2O_6$, etc.

Exemplary compounds wherein phosphorus exists in the +5 oxidation state are the phosphoric acids; orthophosphoric acid, $H_3PO_4$; pyrophosphoric acid, $H_4P_2O_7$; metaphosphoric acid, $HPO_3$; tetraphosphoric acid, $H_6P_4O_{13}$; potassium orthophosphate, $K_3PO_4$; potassium monohydrogen-orthophosphate, $K_2HPO_4$; potassium dihydrogen-orthophosphate, $KH_2PO_4$; potassium pyrophosphate, $K_4P_2O_7$; potassium metaphosphate, $KPO_3$; analogous sodium and ammonium orthophosphates and acid orthophosphates; sodium pyrophosphate, $Na_4P_2O_7$; and sodium triphosphate, $Na_5P_3O_{10}$.

Less common but also suitable in the practice of this invention are the peroxyacids of phosphorus, $H_4P_2O_8$ and $H_3PO_5$, representing the +6 and +7 oxidation states respectively.

It should be noted that many of the foregoing phosphorus compounds have various degrees of hydration; for example, sodium monohydrogen-orthophosphate may exist as $Na_2HPO_4 \cdot 2H_2O$, $Na_2HPO_4 \cdot 7H_2O$, or

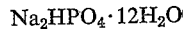

$$Na_2HPO_4 \cdot 12H_2O$$

Such classifications have been omitted from the above formulae for the sake of expediency; however, it is intended that the different hydration states of a given compound be included within the scope of the invention, since only the solubility limits and phosphorus concentration are effected thereby and these may be easily compensated for by properly preparing the solution.

Since pyrophosphoric acid, metaphosphoric acid, and hypophosphoric acid react with water, particularly with hot water, to form orthophosphoric acid, these acids are not usually employed in the free state, it being more economical to begin with orthophosphoric acid directly.

The aqueous solution employed for regeneration may contain two or more different phosphorus acids, or a mixture of one or more acids and salts, or a mixture of two or more salts. The phosphorus compound concentration is not particularly critical and may range from quite dilute up to the limit of saturation at the solution temperature. Excellent results have been achieved with solutions containing from about 0.5% to about 10% by weight of phosphorus compound. The temperature of the solution may range from ambient up to about 200° F. or more. The spent catalyst may be contacted with the solution for a period of from 10 minutes to three hours or more; the solid-liquid contacting may be accomplished batchwise in a treating vessel, or continuously in a co-current or counter-current contacting tower or moving belt-type apparatus, or in situ by providing the converter with suitable flushing connections for passing the regenerating solution therethrough. Following the treatment with phosphorus compound solution, particularly where the solution contains alkali metal ions, it is usually desirable to wash and filter the freshly treated catalyst one or more times. After the catalyst is washed and filtered, it may be dried or calcined at a suitably high temperature, for example, at a temperature of from about 600° F. to about 800° F. or higher. Such drying may be accomplished by ordinary heating means such as a muffle furnace, or the wet, freshly treated catalyst may be dried in situ by passage of hot exhaust gases through the converter bed incidental to the normal operation of the catalytic converter.

The following examples are given for the purpose of illustrating the method of the present invention and to indicate the benefits afforded through the utilization thereof. It is not intended that the present invention be limited to the reagents, concentrations, and/or conditions employed within the examples.

EXAMPLE I

A spherical catalyst comprising 0.2% Pt and 10% CoO by weight deposited on a refractory oxide base consisting of 2% silica and 98% alumina by weight was contaminated with lead by prolonged exposure to lead-containing exhaust gases emanating from an internal combustion engine using leaded fuel. A portion of this leaded catalyst was divided into two 65 cc. samples, each weighing about 20 grams, and designated catalyst sample A and catalyst sample B in Table I below. Catalyst sample A was contacted for about 2 hours at a temperature of 170°–200° F. with a solution containing 4 grams of sodium pyrophosphate dissolved in 200 cc. of water. Following this treatment the pyrophosphate solution was decanted and the treated catalyst washed four times with 100 cc. volumes of water. The washed catalyst was then dried and ignited in a muffle furnace for 1 hour at 1000° F.

Catalyst sample B was similarly treated, except that trisodium orthophosphate was employed instead of sodium pyrophosphate.

The activity of the untreated and treated catalysts, as well as that of fresh catalyst, was tested by measuring the ignition temperature and temperature rise obtained by passage of air containing benzene vapor, under standardized conditions, into and through an apparatus in which a bed of catalyst was gradually heated until ignition of the benzene vapor occurred (as indicated by a temperature differential between bed inlet and bed outlet). A small temperature rise and/or a high ignition temperature indicate a low conversion activity; a correlative evaluation of catalytic mufflers operated on both test automobiles and on dynamometer stands has shown that a catalyst subjected to the foregoing benzene oxidation test must have an ignition temperature of less than about 600° F. and a temperature rise above about 350° F. to perform satisfactorily as an exhaust gas oxidation catalyst.

The conditions of treatment of the deactivated catalyst and a comparison of the activities of fresh catalyst, spent catalyst and regenerated catalyst are shown in Table I.

It will be seen from the data of Table I that both catalyst samples A and B, while still containing more than 90% of the original lead deposit thereon, nevertheless showed a substantial improvement in oxidation activity. Note particularly that catalyst sample B, which was treated with trisodium orthophosphate, had less than 1% of the lead removed therefrom, yet its activity was restored to better than 60% of its original activity with only a small increase in the ignition temperature.

EXAMPLE II

A lead-contaminated catalyst having an original (unleaded) composition at 1% Pt plus 1% Pd by weight on a silica-alumina-zirconia base may be treated for 1 hour with an aqueous solution containing 5% orthophosphoric acid by weight and maintained at about 150° F. The treated catalyst is then washed and dried and, when employed in a catalytic muffler, will show a substantial improvement in exhaust gas oxidation activity.

EXAMPLE III

A spent lead-contaminated catalyst having an original (unleaded) composition of 0.5% Pt and 20% CuO on a silica-alumina base may be contacted for 2 hours with a heated aqueous 10% solution of ammonium monohydrogen-orthophosphate. The treated catalyst is then removed from the solution, washed with water, filtered, and dried for 2 hours at 900° F. The resulting regenerated catalyst, when contacted with a mixture of air and exhaust gases at an elevated temperature, will have a substantially improved exhaust gas oxidation activity.

EXAMPLE IV

A catalyst composite comprising 0.5% Pt and 10% $V_2O_5$ by weight impregnated on an alumina-zirconia base and having the form of ⅛" spheres is employed for the catalytic oxidation of plumbiferous exhaust gases emanating from an internal combustion engine using leaded fuel. The average power output of the engine is 41 brake horsepower at 2500 r.p.m., and after 60 hours operating time the catalyst is nearly completely deactivated. The catalyst is then unloaded from the converter and placed in a treating tank containing a 2% aqueous solution of sodium dihydrogen-hypophosphate, $Na_2H_2P_2O_6 \cdot 6H_2O$. The catalyst is treated for 2 hours at 160° F., the solution then decanted and the catalyst washed, filtered and dried. The resulting regenerated catalyst will now show increased hydrocarbon and carbon monoxide conversion activity.

EXAMPLE V

A spent lead-contaminated particle-form catalyst having an original (unleaded) composition of 0.2% Pt by weight on a (2:93:5) silica-alumina-zirconia base may be contacted for 2 hours at a temperature of 140°–180° F. with an aqueous 10% solution of potassium dihydrogen-orthophosphite. The treated catalyst is then filtered out of the solution, reslurried in water, filtered and ignited for 1 hour at 1000° F. The foregoing treatment will substantially restore the exhaust gas oxidation activity of this catalyst.

EXAMPLE VI

A leaded catalytic composite having an original (un-

Table I

| Catalyst Sample | Wt. Percent Lead | Activity before Reactivation | | Reactivating Treatment | | | Wt. Percent Lead after Reactivation | Activity after Reactivation | |
|---|---|---|---|---|---|---|---|---|---|
| | | Ignition Temp., °F. | Temp. Rise, °F. | Reagent | Gms. Reagent per 100 cc. $H_2O$ | Contacting time, hours | | Ignition Temp., °F. | Temp. Rise, °F. |
| Fresh | 0 | 400 | 600 | | | | | | |
| A | 17.5 | >1,000 | 0 | $Na_4P_2O_7$ | 2 | 2 | 15.8 | 525 | 365 |
| B | 17.5 | >1,000 | 0 | $Na_3PO_4 \cdot 10H_2O$ | 2 | 2 | 17.4 | 475 | 410 | leaded) composition of 0.3% Pt on (88:12) silica-alumina may be treated for 3 hours with an aqueous 1% solution of ammonium hypophosphite. The treated catalyst is then filtered from the solution, reslurried in water, filtered and dried for 1 hour at 800° F. The foregoing treatment will substantially improve the exhaust gas oxidation activity of this catalyst.

I claim as my invention:

1. A method of regenerating a lead-contaminated catalytic composite of a refractory inorganic oxide support and a catalytically active component comprising at least one element selected from the group consisting of groups IB, VA, VIA and VIII of the periodic table, which method comprises contacting said composite with an aqueous solution of from about 0.5% to about 10% by weight of a phosphorus compound forming anions of a phosphorus acid in the solution, said contacting being at from ambient temperature to about 200° F. and for a time period of from about 10 minutes to about 3 hours, whereby to restore a substantial part, at least, of the activity of the catalytic composite, separating the thus treated composite from said solution and drying the same.

2. A method of regenerating a lead-contaminated catalytic composite of a refractory inorganic oxide support and a catalytically active component comprising at least one element selected from the group consisting of groups IB, VA, VIA and VIII of the periodic table, which method comprises contacting said composite with an aqueous solution of from about 0.5% to about 10% by weight of a phosphorus acid at from ambient temperature to about 200° F. and for a time period of from about 10 minutes to about 3 hours, whereby to restore a substantial part, at least, of the activity of the catalytic composite, separating the thus treated composite from said solution and drying the same.

3. The method of claim 2, further characterized in that said acid is orthophosphoric acid.

4. The method of claim 1 further characterized in that said phosphorus compound is a salt of a phosphorus acid.

5. The method of claim 4 further characterized in that said acid is a phosphoric acid.

6. The method of claim 4 further characterized in that said acid is orthophosphoric acid.

7. The method of claim 4 further characterized in that said salt is an alkali metal orthophosphate.

8. The method of claim 4 further characterized in that said salt is an ammonium orthophosphate.

9. The method of claim 4 further characterized in that said acid is pyrophosphoric acid.

10. The method of claim 4 further characterized in that said salt is an alkali metal pyrophosphate.

11. The method of claim 4 further characterized in that said acid is hypophosphoric acid.

12. The method of claim 4 further characterized in that said acid is a phosphorous acid.

13. The method of claim 4 further characterized in that said salt is an alkali metal orthophosphite.

14. The method of claim 4 further characterized in that said acid is hypophosphorous acid.

15. The method of claim 4 further characterized in that said salt is ammonium hypophosphite.

16. The method of claim 1 further characterized in that said catalytically active component comprises platinum.

17. The method of claim 1 further characterized in that said refractory oxide support comprises alumina.

References Cited in the file of this patent

UNITED STATES PATENTS

| | | |
|---|---|---|
| 1,886,411 | Mantell | Nov. 8, 1932 |
| 2,867,497 | Houdry et al. | Jan. 6, 1959 |